United States Patent [19]

Huffman et al.

[11] 4,071,700
[45] Jan. 31, 1978

[54] TESTING APPARATUS

[75] Inventors: Charles E. Huffman, Garland; Robert J. McGuire, Richardson; John W. Waddill, Plano, all of Tex.

[73] Assignee: Rockwell International Corporation, El Segundo, Calif.

[21] Appl. No.: 742,813

[22] Filed: Nov. 18, 1976

[51] Int. Cl.² .............................................. H04J 3/14
[52] U.S. Cl. ................................................. 179/15 BF
[58] Field of Search ........ 179/15 BF, 15 BD, 15 AD, 179/175.2 R, 175.2 C; 325/2, 3

[56] References Cited
U.S. PATENT DOCUMENTS

| | | | |
|---|---|---|---|
| 3,476,922 | 11/1969 | Yiotis | 325/2 |
| 3,873,775 | 3/1975 | Chown | 325/2 |
| 3,940,566 | 2/1976 | Jeppsson | 179/15 BF |

Primary Examiner—Kathleen H. Claffy
Assistant Examiner—Joseph A. Popek
Attorney, Agent, or Firm—Bruce C. Lutz; Robert J. Crawford; L. Lee Humphries

[57] ABSTRACT

Apparatus for testing the operability of a signal translation means which passes signal information containing a definable and repeatable characteristic such as a synchronization signal through the use of a spare similar device and a demodulating device which provides outputs upon detecting the signal passed by each signal translating device. As illustrated, regular and spare transmit multiplexing devices are used and logic information obtained from a spare receiver is used to indicate a failed condition.

6 Claims, 3 Drawing Figures

TESTING APPARATUS

THE INVENTION

The present invention relates generally to electronics and more specifically to apparatus for detecting circuit failure and increasing reliability by indicating failure or by substituting spare units for failed units.

It is common practice in high reliability equipment such as that used for telephone communications or transmission systems to provide spare units which are operated in parallel with a "good" unit so that if one fails there is still a remaining unit operable. Although there are several reliability schemes, the presently prevailing practice is generally to use spares to normally operating units on a one-to-one basis.

The present concept, on the other hand, uses a single spare for one or a plurality of normally used units. As disclosed, the units are multiplexing type transmitters for multiplexing a plurality of input signals to a single output signal containing a synchronizing signal. A spare receiver, which may be used as a substitute for other receivers in the system, is normally used to phaselock with the synchronizing signals of each of the actual and spare transmitters on a cyclical basis and the information obtained upon each lock condition is used in a decoded fashion to determine whether one of the transmit units, the spare transmit, or the spare receive is operable wherein an alarm can be raised and/or suitable switching can be provided to substitute operable spares for normal operational units.

It is, therefore, an object of the present invention to improve detection of failures in signal translation apparatus and to increase operability thereof.

Other objects and advantages of the present invention will be apparent from a reading of the specification and appended claims in conjunction with the drawings wherein:

DETAILED DESCRIPTION

Figure 1:
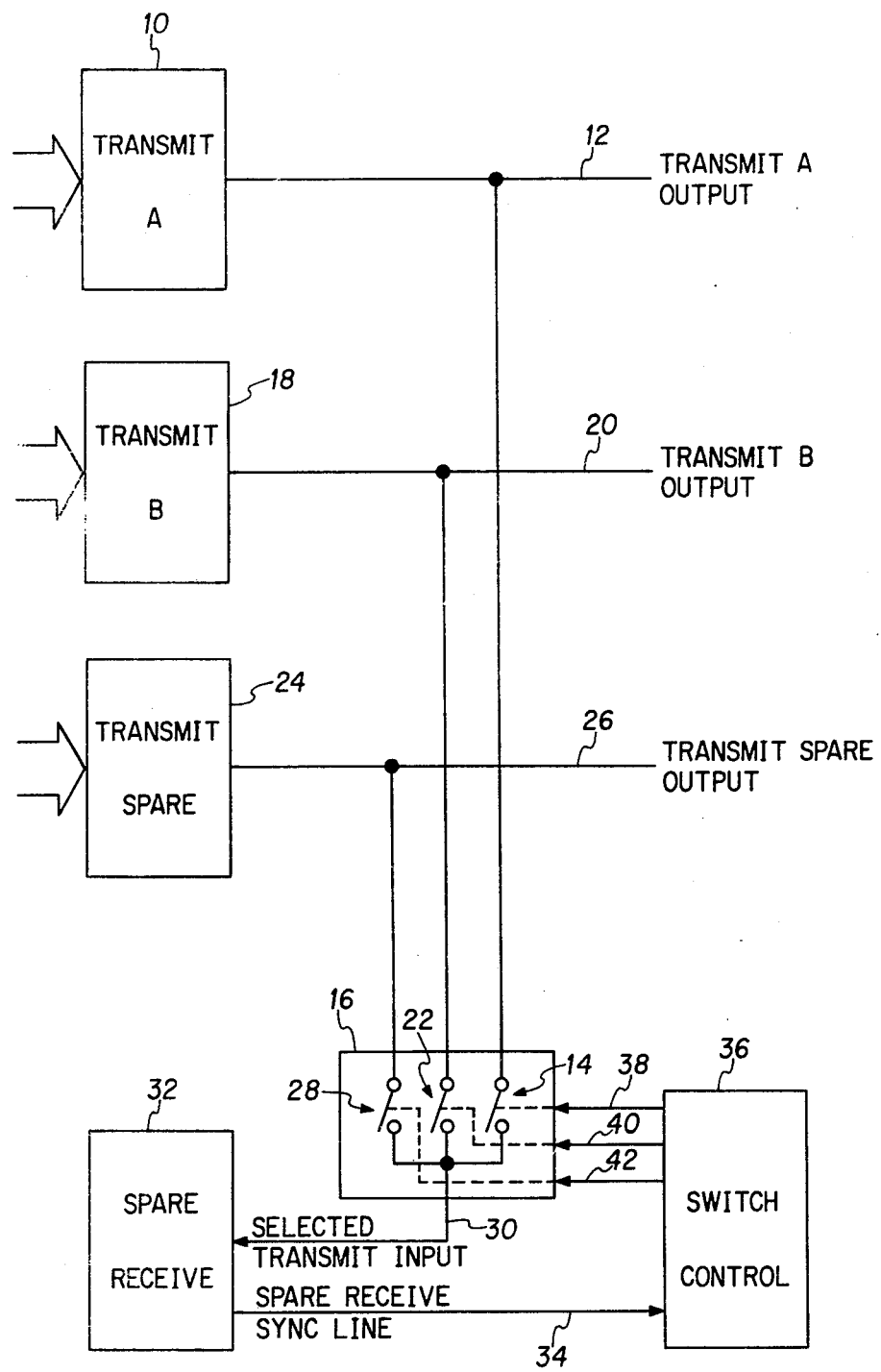
FIG. 1 is a block schematic diagram of a preferred embodiment of the present invention.

In FIG. 1, a transmit block 10 is used to provide output signals on an output lead 12 which is also connected as a first input to a switch 14 within a switching block 16. A transmit block 18 provides synchronized output signals on a lead 20 which is also connected to a switch 22 within block 16. A spare transmit block 24 provides output signals containing a synchronizing portion on a lead 26 and also provides these signals to a switch 28 within block 16. Each of the switches 14, 22 and 28 have their output terminals connected together and to an output lead 30 which supplies input signals to a spare receive block 32 on a selected transmit input line. The spare receive unit 32 provides output signals indicative of the fact that it has "locked" onto the synchronizing signal of an individual transmitter on a lead 34 for supplying this logic level indication to a switch control block 36. Block 36 has output leads 38, 40 and 42 for controlling switches 14, 22 and 28, respectively. Although specifically not shown, switch control 36 is operable to substitute data streams from either of transmit units 10 and 18 to transmit spare 24 in the event of detection of failure of transmit units 10 or 18.

Figure 2:
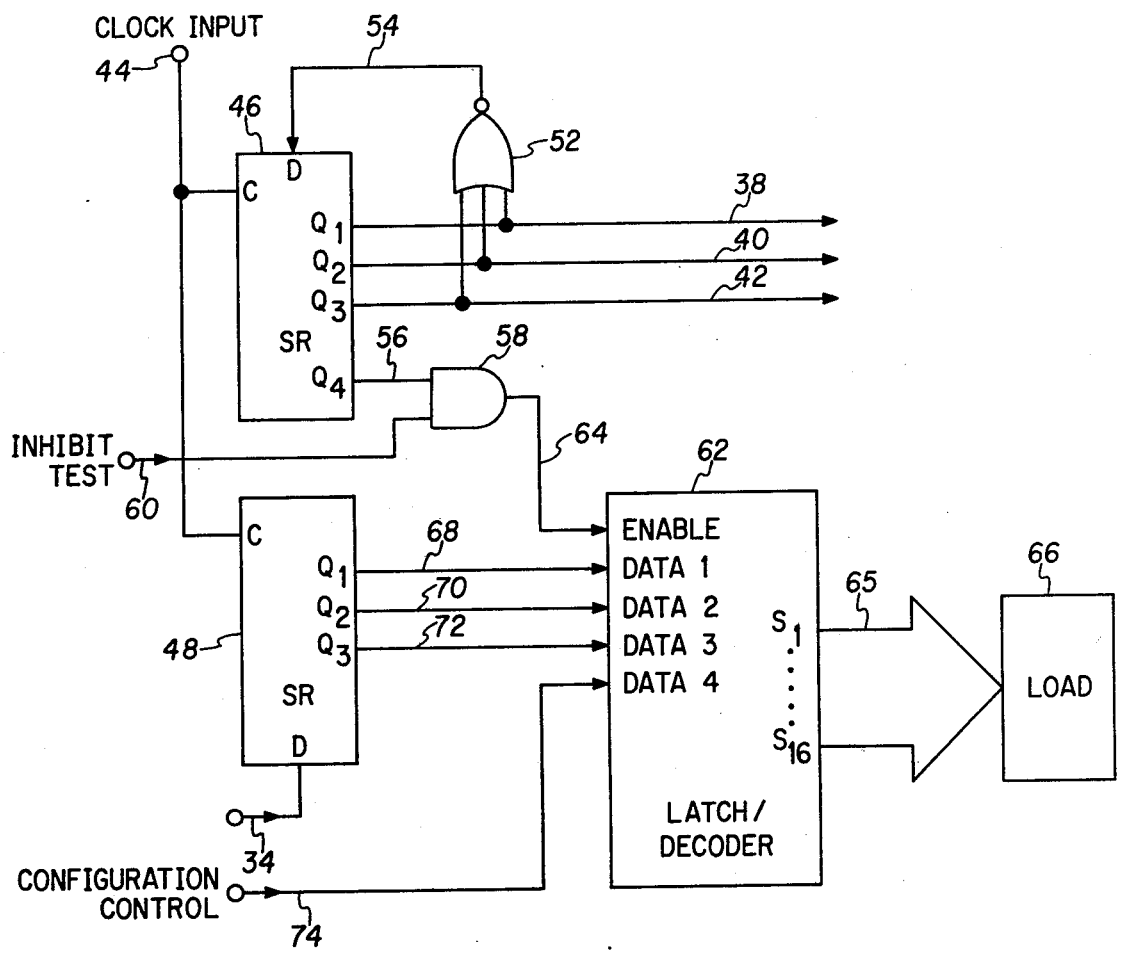
FIG. 2 is a more detailed block diagram of the switch control section of FIG. 1.

In FIG. 2, a clock input lead 44 supplies clock signals to a first shift register 46 and to a second shift register 48. These shift registers may be any type of four-bit shift register such as manufactured by Motorola under the Part Number MC14015. Shift register 46 has three outputs 38, 40 and 42 connected respectively to internally marked outputs Q1, Q2 and Q3. A NOR gate 52 is connected to receive inputs from each of leads 38, 40 and 42 and provides an output to a D input of shift register 46 on a lead 54. With this connection, the shift register is effectively converted to a four-bit ring counter. A Q4 output of shift register 46 is supplied on a lead 56 to an AND gate 58 which also has an inhibit test input signal supplied thereto on a lead 60. An output of AND gate 58 is supplied to an enable input of a latch/decoder 62 on a lead 64. Latch/decoder may be of the type sold by Motorola under Part Number MC14514. The decoder 62 contains 16 parallel outputs supplied over a cable 65 to a load 66. The load 66 would be a set of switches to switch the signals incoming to the various transmit or receive blocks to set alarm systems indicating one of the spare transmit or receive blocks is inoperative. The shift register 48 may be of the same type as shift register 46 and provides outputs on Q1, Q2 and Q3 leads labeled respectively 68, 70 and 72 as data 1, data 2 and data 3 inputs of decoder 62. A configuration control signal is supplied on a lead 74 to a data 4 input of the decoder 62. An input signal from the spare receive is shown on lead 34 which is the same as in FIG. 1.

Figure 3:
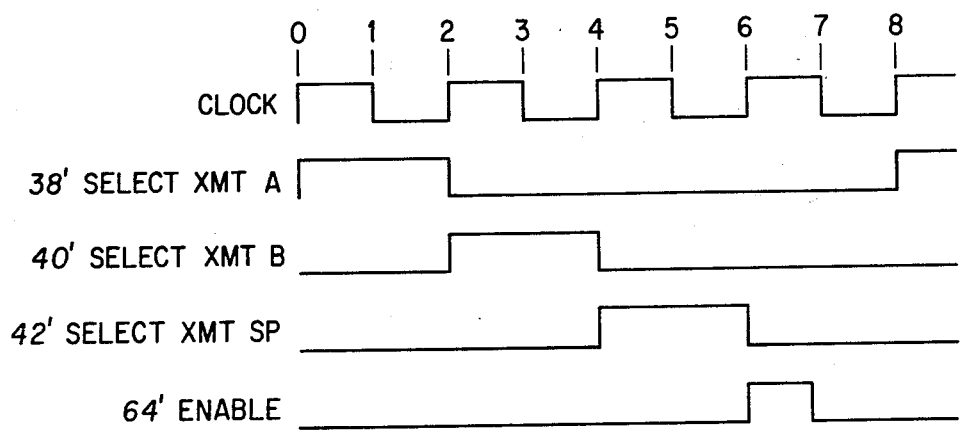
FIG. 3 is a set of waveforms used in describing FIGS. 1 and 2.

In FIG. 3, the clock is illustrated with each half cycle designating a time period. The signal 38', 40' and 42' are indicative of a logic 1 level being used to activate the respective switches 14, 22 and 28 such that transmitter A is supplying signals through switch 14 to the receive unit 32 between times 0 and 2, while transmitter B is supplying signals to receive unit 32 between times 2 and 4 and the output of the spare transmitter 24 is supplying signals to receive unit 32 between time periods 4 and 6. The data is loaded into the decoder between times 6 and 7 and at time 8 the cycle is repeated and signals from transmit unit A are again supplied to receive unit 32 until time period 10 (not shown).

The present system is used in one embodiment with the DMX-13 muldem system produced by Collins Radio so as to increase the reliability of the total transmit receive system. The transmitter such as 10 may be a unit designated as DX-31A and sold by Collins Radio while the spare receive unit 32 may be the one designated by Collins as the DX-32A. The switch 16 may be any plurality of electrically operated switches which may be obtained from many sources including relays or solid state switches.

OPERATION

As illustrated in FIGS. 1—3, a normal system comprises two transmitters A and B (10 and 18) which are multiplexing a plurality of steams of input data and providing multiplexed outputs which contain synchronizing information. The standard M13 format of Western Electric comprises a 44.736 megabit per second data stream. This data stream is broken up into major frames and subframes. Each subframe requires 1.49 milliseconds to complete and each of these subframes contains a sync format having logic levels of 1001 evenly distributed through the subframe and accordingly through the frame. The transmit spare unit 24 may use dummy bits or actual data for its spare operation. In any event, it is operating to produce the synchronizing bits at the appropriate time. The switch control unit 36 cyclically operates switches 14, 22 and 28 in accordance with that shown in FIG. 3 so as to first supply the data stream from unit 10 to spare receive unit 32. When receive unit 32 locks onto the sync signal, an output is supplied on 34 to control unit 36. The time from clock 0 to clock 2 is 50 milliseconds and it normally takes approximately 2 milliseconds for the receiver 32 to synchronize with the output from transmitter A. In some instances, this synchronization can occur in substantially less than 2 milliseconds and in only a few cases will it be as long as 10 milliseconds. Thus, there is a substantial amount of time for the synchronizing action to occur. At time period 2, the output from transmitter 18 is supplied to spare receiver 32. At all times, the output from transmitters 10 and 18 are supplied to whatever signal transmission medium is used such as antennas or cables. After time period 4, transmit spare unit 24 supplies its signals through switch 28 to the receive unit 32.

Although not shown in FIG. 1, if there is a failure to receive a sync signal on line 34 during the appropriate time for one of the transmit units 10, 18 and 24, an alarm will be indicated and the spare 24 will be used as a substitute for either of units A or B. If the indication is that spare 24 is no longer providing a synchronous output signal, then the alarm will merely be raised indicating that there is no longer a spare unit. If, on the other hand, there is no synchronized signal received on line 34 for any of the three time periods, it will be presumed that the spare receive unit 32 is inoperative and an alarm to that effect will be raised.

Further information as to the logic used by load 66 is provided in Table 1. As will be noted a logic "0" on the data 4 input indicates a two-channel system with one spare channel. Logic "1" on the data 4 input indicates a one-channel system with one spare channel. Although the logic appears redundant, it allows use of the same decoding circuitry. Finally, a logic "1" on all of data inputs 1, 2 and 3 indicates a receive unit failure.

TABLE 1

| | Xmt A Data 1 | Xmt B Data 2 | Xmit Spare Data 3 | Select Data 4 | Designation |
|---|---|---|---|---|---|
| $S_1$ | 0 | 0 | 0 | 0 | No failures |
| $S_2$ | 0 | 0 | 1 | 0 | Xmt spare failure |
| $S_3$ | 1 | 0 | 0 | 0 | Xmt A failure |
| $S_4$ | 1 | 0 | 1 | 0 | Xmt spare and Xmt A failure |
| $S_4$ | 0 | 1 | 0 | 0 | Xmt B failure |
| $S_5$ | 0 | 1 | 0 | 0 | Xmt B failure |
| $S_6$ | 0 | 1 | 1 | 0 | Xmt spare and Xmt B failure |
| $S_7$ | 1 | 1 | 0 | 0 | Xmt A and Xmt B failure |
| $S_8$ | 1 | 1 | 1 | 0 | Spare Receiver failure |
| $S_9$ | 0 | 0 | 0 | 1 | No failures |
| $S_{10}$ | 0 | 0 | 1 | 1 | Xmt spare failure |
| $S_{11}$ | 1 | 0 | 0 | 1 | Xmt A failure |
| $S_{12}$ | 1 | 0 | 1 | 1 | Spare Receiver failure |
| $S_{13}$ | 0 | 1 | 0 | 1 | No failures |
| $S_{14}$ | 0 | 1 | 1 | 1 | Xmt spare failure |
| $S_{15}$ | 1 | 1 | 0 | 1 | Xmt A failure |
| $S_{16}$ | 1 | 1 | 1 | 1 | Spare Receiver failure |

Referring to FIG. 2, it will be noted that the output leads from ring counter 46 operate via leads 38 through 42 to operate the switches within block 16 of FIG. 1. Thus, there is merely a logic level change on a rotating basis. This rotating logic level also operates to periodically actuate lead 56. Lead 60 is normally a logic 1 so that whenever lead 56 is a logic 1, the device 62 will be enabled so as to receive the data from each of the lines 68, 70 and 72. The shift register 48, at time periods 2, 4 and 6, respectively, samples the logic value of lead 34 and shifts these logic values upward through the shift register 48. Immediately after time period 6, each of these logic levels ar input to decoder 62 via the signal on the lead 56 and accordingly on 64 and the decoder provides an output indicative of the logic levels received. The configuration control lead 74 is provided since, as indicated above, the system allows for use of either one multiplexing transmitter or the two shown in FIG. 1. In other words, the lead 74 is changed to a logic level 1 so as to provide the outputs on leads 9 through 16 if there is only 1 transmit unit normally operating or on 1 through 8 if there are two transmit units normally operating. If one of the normal receivers fails and the receive unit 32 needs to be utilized, the lead 60 drops from a logic 0 to a logic 1 and inhibits further operation of this testing procedure.

The data supplied on leads 65 to load 66 is used to provide the appropriate switching, as indicated in Table 1, for either providing alarm conditions or to substitute a spare transmit unit for a failed transmit unit A or B.

While we have provided a disclosure of a preferred embodiment of the invention, it is to be realized that this is not limited to multiplexers or transmitters but may be used with any type of signal translating device such as modulators and demodulators, coders and decoders, etc., as long as there is some internal signal such as a synchronizing signal in each unit which may be detected.

We, thus, wish to be limited only by the scope of the appended claims.

What is claimed is:

1. A method of checking operativeness of at least one active transmitter passing a synchronized data stream and at least one spare transmitter using a spare receiver comprising, the steps of:
    multiplexing signals in a spare transmitter to provide a synchronized data stream;
    cyclically presenting multiplex data outputs from active and spare transmitters to a spare receiver for providing a given logic level output as synchronization is obtained with each data stream; and
    cyclically decoding synchronization logic level output results for determining operability of said transmitters and said spare receiver.

2. Apparatus for checking the operativeness of at least one active transmitter and at least one spare transmitter using a spare receiver comprising, in combination:
    active and spare transmitter means for providing synchronized output logic level bit streams;
    spare receiver means, connected to said transmitter means, for cyclically receiving bit stream outputs therefrom for providing a given logic level output as synchronization is obtained with each stream; and
    decoding means, connected to said spare receiver, for decoding synchronization logic level results for determining operability of said transmitters and said spare receiver.

3. A failure detection system for operational signal processing means which pass data signals containing repeatable and definable characteristics comprising, in combination:

first means for supplying signals representative of those passed by said operational signal processing means;

spare signal processing means for providing at an output thereof signals containing the repeatable and definable characteristics;

signal receiving means, connected to said first means and said spare means, for cyclically receiving and detecting said repeatable and definable characteristics and providing output signals indicative of each detection, and decoding means, connected to said receiving means, for logically providing outputs, in the alternative, of failure of one of: (1) said operational signal processing, (2) said spare signal processing means, and (3) said signal receiving means.

4. Apparatus as claimed in claim 3 comprising, in addition:

switching means for switching a data stream for passage through the spare signal processing means rather than the operational signal processing means upon an indication of failure of said operational signal processing means by the outputs of said decoding means.

5. A failure detection system for use with signal translation means which output synchronized data streams and which means require spare transmitters and/or spare receivers comprising, in combination:

spare transmit means for outputting synchronized logic level bit streams;

regular transmit means for outputting synchronized data bit streams;

receiver means for providing a given logic level output signal upon synchronizing with an incoming bit stream;

switch means connecting said transmit means to said receiver means, and control means connected to said receiver means and said switch means for enabling said switch means to cyclically and successively apply bit streams for each of said transmit means to said receiver means and for providing an output control signal when said given logic level signal is not generated within a predetermined time.

6. Apparatus as claimed in claim 5 comprising, in addition:

signal responsive means, connected to said control means for diverting data streams from a failed regular transmit means to said spare transmit means and preventing further cyclical operation of said control means when said control means provides said output control signal.

* * * * *

UNITED STATES PATENT AND TRADEMARK OFFICE
CERTIFICATE OF CORRECTION

PATENT NO. : 4,071,700
DATED : 1/31/78
INVENTOR(S) : Charles E. Huffman, Robert J. McGuire and John W. Waddill It is certified that error appears in the above-identified patent and that said Letters Patent are hereby corrected as shown below:

IN THE DETAILED DESCRIPTION

Column 2, line 31, delete "signal" and substitute therefor --signals--.

IN THE OPERATION

Column 2, line 57, delete "steams" and substitute therefor --streams--.

Column 3, Table 1, delete second occurrence of line $S_4$, which is:

"$S_4$   0   1   0   0     Xmt B failure" - Please cancel this line completely.

Column 4, line 5, delete "ar" and substitute therefor --are--.

Signed and Sealed this

Twenty-third Day of May 1978

[SEAL]

Attest:

RUTH C. MASON
Attesting Officer

LUTRELLE F. PARKER
Acting Commissioner of Patents and Trademarks